United States Patent
Power et al.

(10) Patent No.: US 9,461,284 B2
(45) Date of Patent: Oct. 4, 2016

(54) SWAPPABLE, CONFIGURABLE AND STRUCTURAL BATTERY PACK FOR ELECTRIC VEHICLES

(71) Applicant: Tata Technologies Pte Ltd, Singapore (SG)

(72) Inventors: Kevin Power, Novi, MI (US); John Donato, Novi, MI (US); Anthony Jones, Novi, MI (US)

(73) Assignee: Tata Technologies Pte Limited, Singapore (SG)

( * ) Notice: Subject to any disclaimer, the term of this patent is extended or adjusted under 35 U.S.C. 154(b) by 697 days.

(21) Appl. No.: 13/739,423

(22) Filed: Jan. 11, 2013

(65) Prior Publication Data
US 2013/0177795 A1   Jul. 11, 2013

(30) Foreign Application Priority Data
Jan. 11, 2012  (IN) .............................. 98/MUM/2012

(51) Int. Cl.
*H01M 2/10*   (2006.01)
*B60L 11/18*  (2006.01)

(52) U.S. Cl.
CPC ........ *H01M 2/1077* (2013.01); *B60L 11/1822* (2013.01); *B60L 11/1877* (2013.01); *B60L 11/1879* (2013.01); *Y02T 10/7005* (2013.01); *Y02T 10/7055* (2013.01); *Y02T 10/7072* (2013.01); *Y02T 90/124* (2013.01); *Y02T 90/14* (2013.01); *Y10T 29/49115* (2015.01)

(58) Field of Classification Search
CPC ............ B60K 1/04; B60K 2001/0455; B60K 2001/0466; B60K 2001/0494; B60L 11/1822
See application file for complete search history.

(56) References Cited

U.S. PATENT DOCUMENTS

| | | | |
|---|---|---|---|
| 5,378,555 A | 1/1995 | Waters et al. | |
| 5,760,569 A * | 6/1998 | Chase, Jr. ................ | B60K 1/04 104/34 |
| 6,631,775 B1 * | 10/2003 | Chaney .................... | B60K 1/04 180/65.1 |
| 7,520,355 B2 * | 4/2009 | Chaney .................... | B60K 1/04 180/68.5 |
| 7,993,155 B2 * | 8/2011 | Heichal .................... | B60K 1/04 180/65.1 |
| 8,146,694 B2 * | 4/2012 | Hamidi .................... | B60K 1/04 180/68.5 |
| 8,256,553 B2 * | 9/2012 | De Paschoal ............ | B60G 3/20 180/65.1 |
| 8,347,995 B2 * | 1/2013 | Fernandez-Mateo .... | B60K 1/04 180/65.22 |
| 8,511,413 B2 * | 8/2013 | Ojima ...................... | B60K 1/04 180/68.5 |

(Continued)

FOREIGN PATENT DOCUMENTS

EP   2340951 A2   6/2011
WO  2010125395 A1  11/2010

OTHER PUBLICATIONS

BERR—Department for business Enterprise & Regulatory Reform (CENEX) "Investigation into the Scope for the Transport Sector to Switch to Electric Vehicles and Plug in Hybrid Vehicles" "Oct. 2008" "Issue 1 Oct. 17, 2008".

(Continued)

*Primary Examiner* — Katy M Ebner
(74) *Attorney, Agent, or Firm* — Merchant & Gould P.C.

(57) ABSTRACT

An apparatus for swappable battery packaging for electric vehicle, the apparatus is contributing for dual purpose of protecting the batteries and providing contribution to the overall structural performance of the vehicle. The apparatus offer self repairable battery packing system to even a novice user thereof, offering each of replacement or recharging operations.

7 Claims, 8 Drawing Sheets

(56) References Cited

U.S. PATENT DOCUMENTS

| | | | | |
|---|---|---|---|---|
| 8,516,687 | B2* | 8/2013 | Hozumi | B60L 11/1822 187/218 |
| 8,668,037 | B2* | 3/2014 | Shinde | B62K 5/025 180/60 |
| 8,863,911 | B2* | 10/2014 | Ecochard | B60L 11/1822 187/240 |
| 8,925,983 | B2* | 1/2015 | Ohgitani | B60K 1/04 292/213 |
| 9,034,504 | B2* | 5/2015 | Kang | H01M 2/1072 429/100 |
| 2010/0145717 | A1* | 6/2010 | Hoeltzel | B60K 1/04 705/1.1 |
| 2010/0181129 | A1 | 7/2010 | Hamidi | |
| 2010/0291418 | A1* | 11/2010 | Zhou | H01M 2/1005 429/50 |
| 2012/0111654 | A1* | 5/2012 | Origuchi | B60K 1/04 180/68.5 |
| 2012/0223113 | A1* | 9/2012 | Gaisne | H01M 2/1083 224/538 |
| 2014/0165354 | A1* | 6/2014 | Ojima | B60K 1/04 29/281.1 |

OTHER PUBLICATIONS

Better Place "Project Better Place—How It Works" "http://www.youtube.com/watch?v=BxbEWwZ6np8&feature=related".

Nissan Motor Company Ltd "Nissan Leaf," available at "http://en.wikipedia.org/wiki/Nissan_Leaf" as of Jan. 11, 2013.

Fisker Automotive "Fisker Automotive," available at "http://www.facebook.com/fiskerauto?sk=app_7146470109" as of Jan. 11, 2013.

* cited by examiner

SWAPPABLE, CONFIGURABLE AND STRUCTURAL BATTERY PACK FOR ELECTRIC VEHICLES

This application claims benefit of Serial No. 98/MUM/2012, filed 11 Jan. 2012 in India and which application is incorporated herein by reference. To the extent appropriate, a claim of priority is made to the above disclosed application.

FIELD OF THE INVENTION

The present invention relates to an electrical vehicle battery packaging and more particularly to a swappable battery packaging offering a structural rigidity to the vehicle.

BACKGROUND OF THE INVENTION

The concept of the electric/hybrid vehicle is highly researched subject matter in an automobile field. The electric/hybrid vehicle produces zero emission of carbon as it requires energy produced by the battery modules for propulsion.

Battery modules disposed in the electric vehicle provide power to the vehicle. The power of the vehicle can be increased by introducing more number of battery modules to the vehicle.

Conventionally, all electric vehicles require a large battery module. In the current battery technology the pack occupies a significant portion of the total vehicle mass and requires substantial volume as well. In addition, such structured battery pack has limited life constraint by capacity and weight of battery packs.

For recharging the battery, the driver has to halt the vehicle at several charging stations. Thus more time is wasted each time for recharging or driver has to swap for a fresh battery.

Swapping of conventional battery module arrangement is not easy as the battery module is not standardized due to its shape, weight and capacity. Therefore, swapping of battery modules is a time consuming and cumbersome task. One such system for swappable battery pack for electric vehicle is disclosed in the US patent application number 20100181129 by Vahid Hamidi, which discloses a swappable feature of a battery pack, constraining to swapping of each individual battery modules only, and not to a complete battery pack.

Thus, from users' perspective one who may not be necessarily proficient enough to repair the battery, replacing an individual battery module from the battery pack is complex task. Further, during displacement of the entire battery, the disassembly of electric connections, outer case and linear actuators in the vehicle is difficult and time consuming task. Furthermore, the battery packs disclosed hitherto, believed to force augmentation structural instability and blemish the ruggedness of the vehicle body.

Thus, there exists a need for providing swappable battery to address the long-standing problem of swappable battery packaging system that is further adapted to provide a structural rigidity to the vehicle architecture resulting in an overall mass optimization.

OBJECTS OF THE INVENTION

The principal object of the present invention is to provide a swappable and configurable battery pack structure for an electric vehicle.

It is another object of this invention to offer a self-repairable battery packing system, to even a novice user thereof, offering each of replacement or recharging operations.

It is another object of the present invention to provide a battery pack that contributes to the structural rigidity of the vehicle allowing for overall mass optimization.

It is another object of this invention to provide a battery package designed to support multiple configurations of batteries allowing for desired variable capacity.

It is another object of this invention to provide a battery package comprising a plurality of cooling ports for cooling an interior ambient of the battery pack.

It is yet another object of this invention to secure a battery packs in defined position via a securing means such that the securing means is adapted to prevent the batteries from loose connections that would result in loss of power.

Further objects and advantages of this invention will become apparent from consideration of the drawings and descriptions that follow.

SUMMARY OF THE INVENTION

Before the assembly, components and methods are described, it is to be understood that this invention is not limited to the particular assembly and methods described, as there can be multiple possible embodiments of the present invention, which are not expressly defined in the present disclosure. It is also to be understood that the terminology used in the description is for the purpose of describing the particular versions or embodiments only, and is not intended to limit the scope of the present invention which will be limited only by the appended claims.

In one aspect of the invention, an apparatus for battery packaging for an electric vehicle is provided, the apparatus comprising a plurality of battery modules, each of the battery module having a first electrical receptacle at bottom thereof; an housing commensurating with geometry of the battery module, the housing is adapted to compactly accommodate the plurality of battery modules; an internal base surface of the housing covered with an electro-mechanical insulator and a pair of bus bar mounted thereon, the electro-mechanical insulator, is adapted to extend an electrical contacts to the first electrical receptacles of each of the battery module; a plurality of interlocking blocks affixed at an outer surface of at least one face of the housing, each block having a hole on the surface thereof; a plurality of locator pin disposed on an adjoining vertical surface of the vehicle, each of the locator pin is adapted to mechanically secure a corresponding interlocking block; a slidable racket beneath the interlocking blocks comprising plurality of alternately placed slidable depressions to lock the interlocking blocks there within; and a second electrical receptacle extending there from at least one surface of the housing for establishing an electrical connection with the corresponding electrical contacts of the vehicle.

In one aspect of the invention, a method for swappable battery package for an electric vehicle is provided, the battery package disposed within a housing, the method comprises: configuring a plurality of battery modules within the housing; coating an internal base surface of the housing with an electro-mechanical insulator and a pair of bus bar mounted thereon; affixing a plurality of interlocking blocks at an outer surface of at least one face of the housing, each block having a hole on a surface thereof; disposing a plurality of locator pins on an adjoining vertical surface of the vehicle, disposing a slidable ratchet beneath the interlocking blocks comprising plurality of alternately placed slidable depressions to lock the interlocking blocks therewith in; and disposing a second electrical receptacle extending there from at least one surface of the housing for establishing an electrical connection with corresponding electrical contacts of the vehicle.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention. However, the invention is not limited to the specific assembly and methods disclosed in the drawings. The present invention will now be described with reference to the accompanying drawing, in which.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any assemblies and methods similar or equivalent to those described herein can be used in the practice or testing of embodiments of the present invention, the preferred, systems, assemblies and methods are now described. The disclosed embodiments are merely exemplary of the invention, which may be embodied in various forms.

The present invention provides an apparatus and a method for battery packaging for an electric vehicle. The battery packaging apparatus comprises a plurality of battery modules where each of the battery module having a first electrical receptacles at bottom thereof. The battery packaging apparatus further comprises an housing commensurating with a geometry of the battery module wherein the housing is adapted to compactly accommodate the plurality of battery modules. The housing comprises an internal base surface of the housing covered with an electro-mechanical insulator and a pair of bus bar mounted thereon. Further, the electro-mechanical insulator is adapted to extend an electrical contacts to the electrical receptacles of each of the battery module and a plurality of interlocking blocks affixed at an outer surface of at least one face of the housing where. Each of the interlocking having a hole on the surface thereof and a plurality of locator pin disposed on an adjoining vertical surface of the vehicle. Each of the locator pin is adapted to mechanically secure a corresponding interlocking block and a slidable ratchet beneath the interlocking blocks comprising plurality of alternately placed slidable depressions to lock the interlocking blocks there within. Further, a second electrical receptacle extending there from at least one surface of the housing for establishing an electrical connection with the corresponding electrical contacts of the vehicle.

Figure 1:
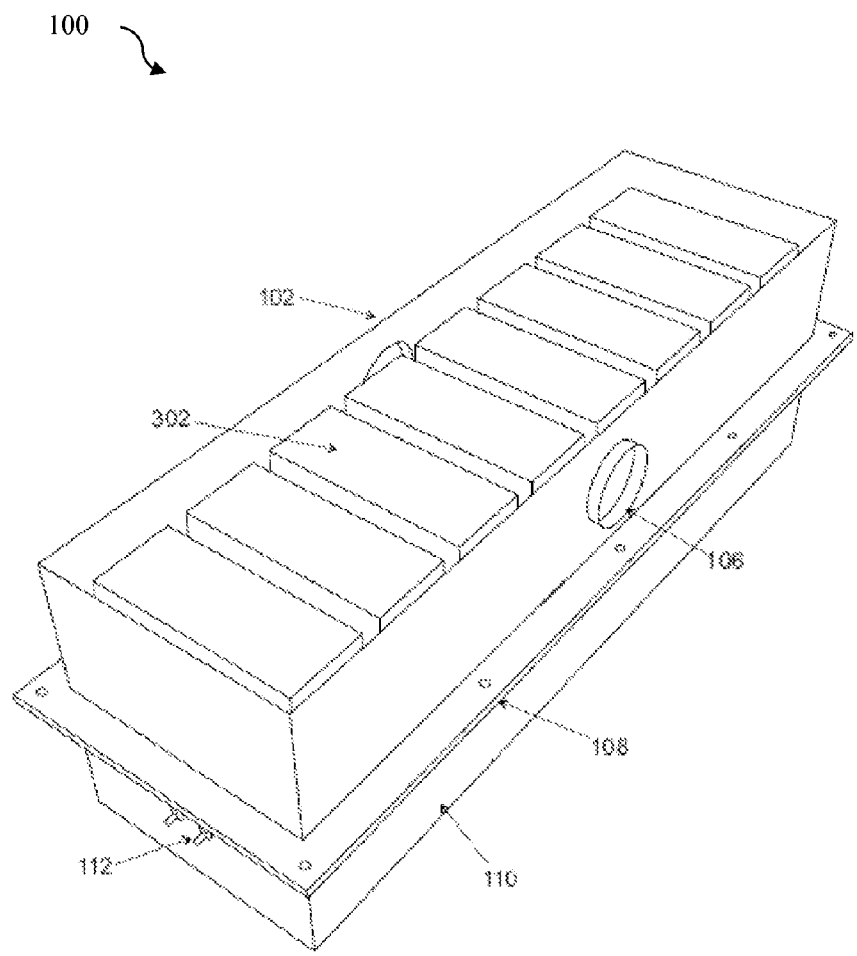
FIG. 1 illustrates an apparatus for a battery packaging for an electric vehicle.

FIG. 1 illustrates an apparatus for battery packaging for an electric vehicle.

Referring to FIG. 1, an apparatus (100) for battery packaging for an electric vehicle comprises a main structural housing (102), a configurable rack, a cooling vent (106), an interlocking block (108), a communication port (110), and a main electrical point (112).

According to preferred embodiment of the invention, the housing (102) comprises an outer base surface and an inner base surface. The configurable rack is disposed on the inner base surface. The housing (102) is configured with the at least one cooling vent (106) such that it provides an air cooling to interior portion of the housing (102). The communication port (110) is disposed on the inner base surface adapted to provide current flow from the battery to the main electrical point (112). The main electrical point (112) is connected with the vehicle main vehicle electrical housing providing power to the vehicle.

According to another embodiment of the invention, the housing (102) provides dual purpose of protecting the batteries and providing additional support to the overall structural performance of the vehicle. The interlocking block (108) is of adequate design to transmit structural load. The plurality of interlocking blocks (108) affixed at the outer surface of the housing (102), the interlocking block (108) having a hole (206) on the surface thereof. The interlocking blocks (108) are positioned on both sides of the housing (102). The interlocking blocks (108) provides support as attachment point for the housing (102). The interlocking blocks (108) can be coupled to structure disposed with a locator pin (502). According to exemplary embodiment of the invention, the interlocking blocks (108) are used to fix the apparatus (100) to the vehicle structure. According to another exemplary embodiment of the invention, the housing (102) is fabricated from a molded reinforced plastic such as fiber glass filled polypropylene.

Figure 2:
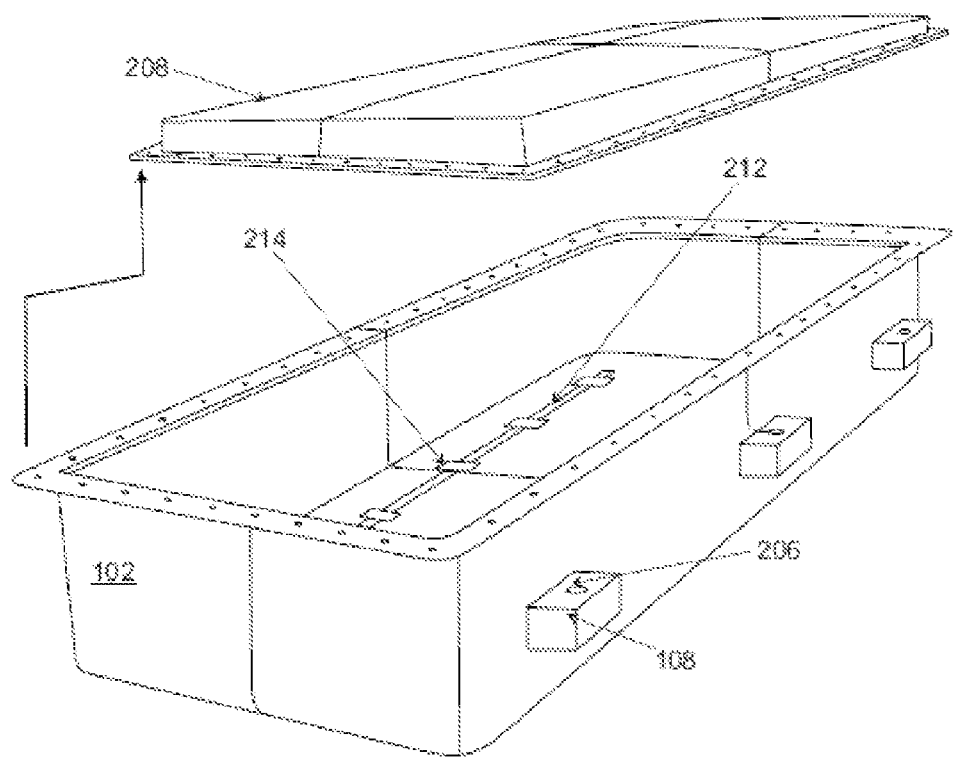
FIG. 2 illustrates an outer, inner base surface of housing with lid according to one exemplary embodiment of the invention.

FIG. 2 illustrates an outer and inner base surface of main housing according to exemplary embodiments of the invention.

Referring to FIG. 2, the apparatus (100) further comprises a lid (208) for covering the housing (102) thus providing protection to the battery from water and dust ingress. The lid (208) is disposed with an attachment means for attaching the lid (208) with the housing (102) to make it complete assembly. The lid (208) is attached to the housing (102) via fastening means. According to one exemplary embodiment of the invention the fastening means are made from steel of sufficient grade to withstand calculated forces. The fastening means used in the invention is a screw.

According to preferred embodiment of the invention, the apparatus (100) further comprises a bus bar (212) and a plug/connection block (214). The bus bar (212) is disposed on the inner surface of the housing (102) allowing the main voltage and current to be conducted. The plug/connection block (214) is disposed on the inner surface of the housing (102) allows a battery modules (302) to be plugged or unplugged. According to one exemplary embodiment of the invention, the bus bar (212) used is copper bus bar.

Figure 3:
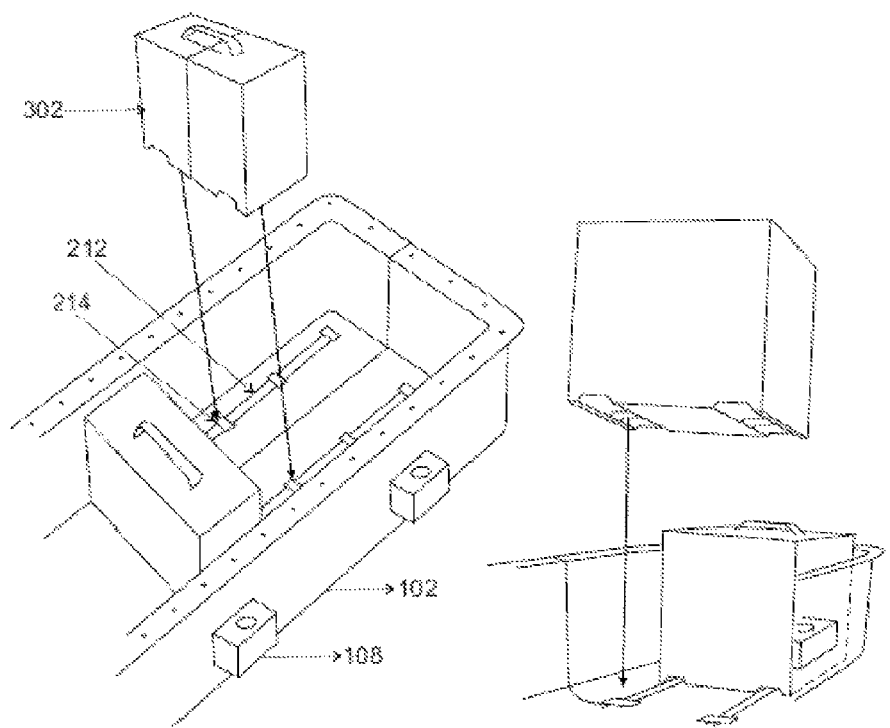
FIG. 3 illustrates battery housing disposed with the battery module according to one exemplary embodiment of the invention.

FIG. 3 illustrates a battery housing disposed with the battery module according to one exemplary embodiment of the invention.

Referring to FIG. 3, according to preferred embodiment of the invention, the housing (102) comprises the configurable rack disposed on the inner base surface adapted to compactly accommodate the plurality of battery modules (302). The plurality of battery modules (302) has a first electrical receptacle at bottom thereof. The housing (102) is designed to achieve maximum configuration of the battery modules (302).

According to another embodiment of the invention, the internal base surface (204) of the housing (102) covered with an electro-mechanical insulator (402) (shown in FIG. 4) and a pair of bus bar (212) mounted thereon, the electro-mechanical insulator (402) is adapted to extend an electrical contacts to the first electrical receptacles of each of the battery module (302). According to one exemplary embodiment of the invention, the electro-mechanical insulator (402) is manufactured from synthetic rubber.

Figure 4:
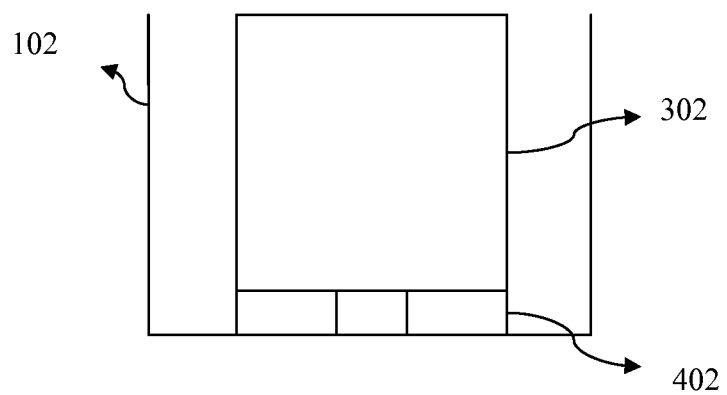
FIG. 4 illustrates positioning of an electro-mechanical insulator according to one exemplary embodiment of the invention.

FIG. 4 illustrates positioning of electro-mechanical insulator according to one exemplary embodiment of the invention.

Referring to FIG. 4, the apparatus (100) for battery packaging is to be a structural member, the battery modules (302) may be mechanical insulated from the housing (102). This is achieved by disposing the electro-mechanical insulator (402) on the inner base surface and forming an insulated layer in order to protect the housing (102) from heat and electric leakage When the battery modules (302) are required to be structural member, the battery modules (302) are mechanically insulated from the housing (102) by inserting damping pads. Disposing of the electro-mechanical insulator (402) on the inner base surface such as damping pads is apparent to those skilled in the art.

Figure 5:
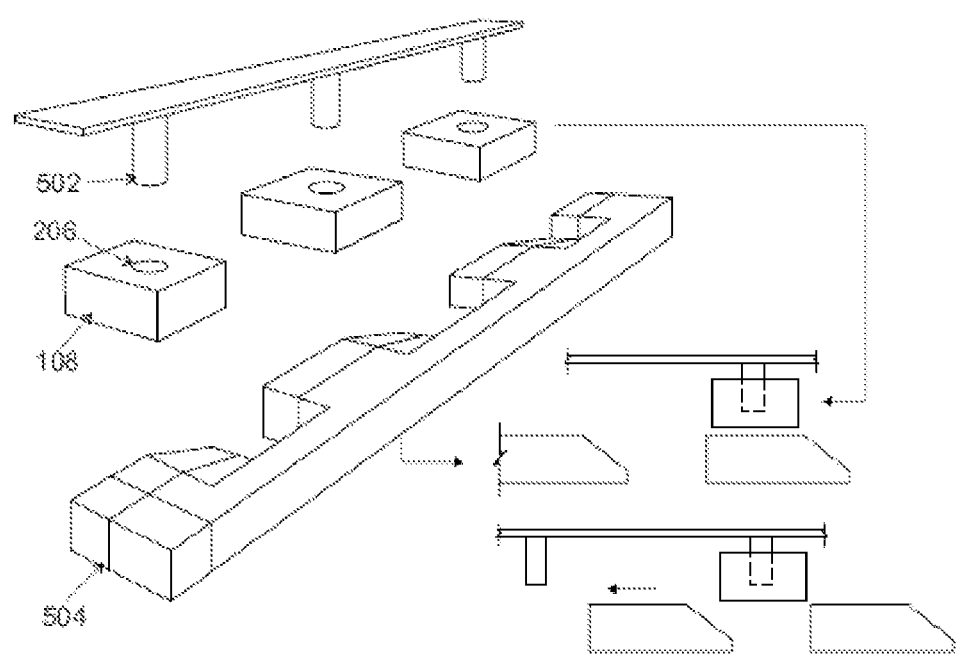
FIG. 5 illustrates a mechanism of battery pack located to the vehicle structure according to one exemplary embodiment of the invention.

FIG. 5 illustrates a mechanism of battery packing apparatus located to the vehicle structure according to one exemplary embodiment of the invention.

According to one embodiment of invention, to securely fix and hold the housing (102) to the body of the vehicle, the hole (206) of each interlocking block (108) is aligned with the locator pin (502) on the body of said vehicle and the locator pins (502) fit in the holes (206) of the interlocking blocks (108) as depicted in FIG. 5. The final action that secures the apparatus (100) to the vehicle body is provided by sliding an interlocking bar (504) with matching vacancies that accommodate all of the interlocking blocks (108). The sliding bar (504) is securely fixed to the structural part of the vehicle body. It can be moved in and out of position using ratcheting mechanism.

In an embodiment of the invention, connection between the vehicle and the battery module (302) is of adequate rigidity such that the battery modules (302) supports in structural performance of the vehicle. Bolts of threaded form are used in order to make the swapability effortless and during removal.

Figure 6:
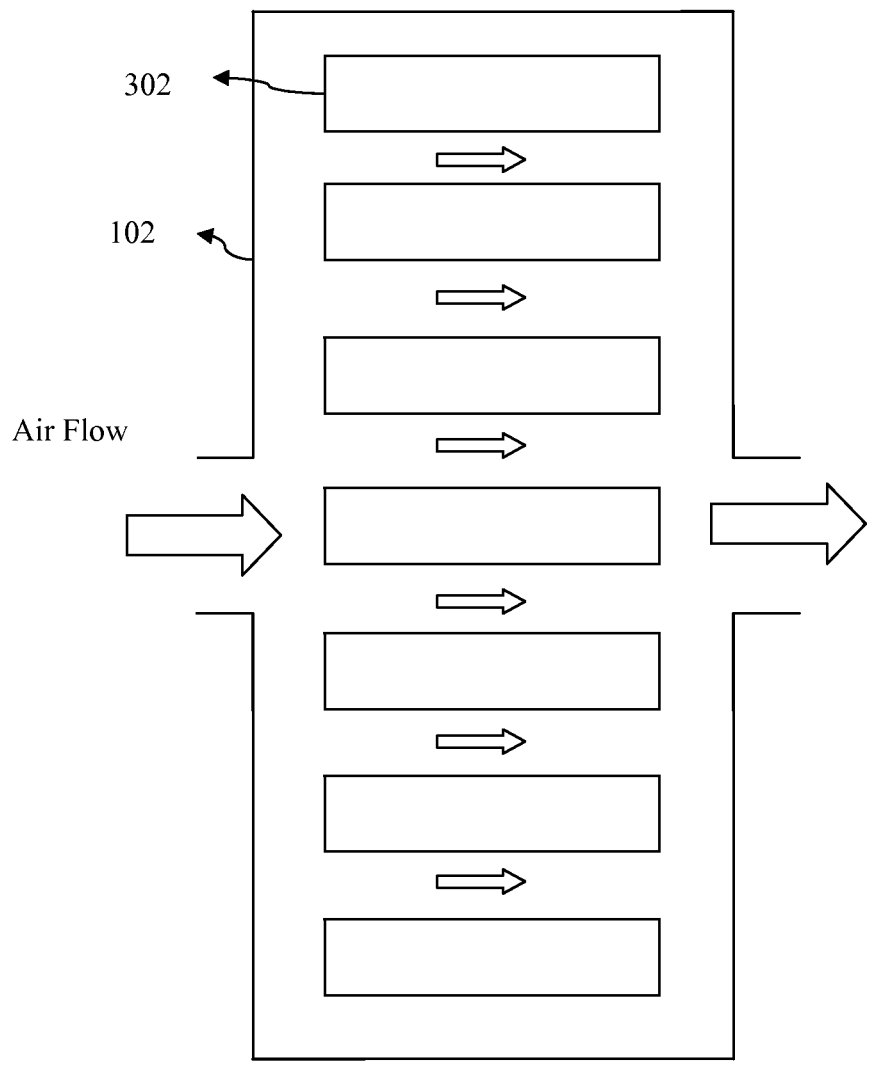
FIG. 6 illustrates one possible configuration for air cooling of the battery.

FIG. 6 illustrates one possible configuration for air cooling of the battery.

Figure 7:
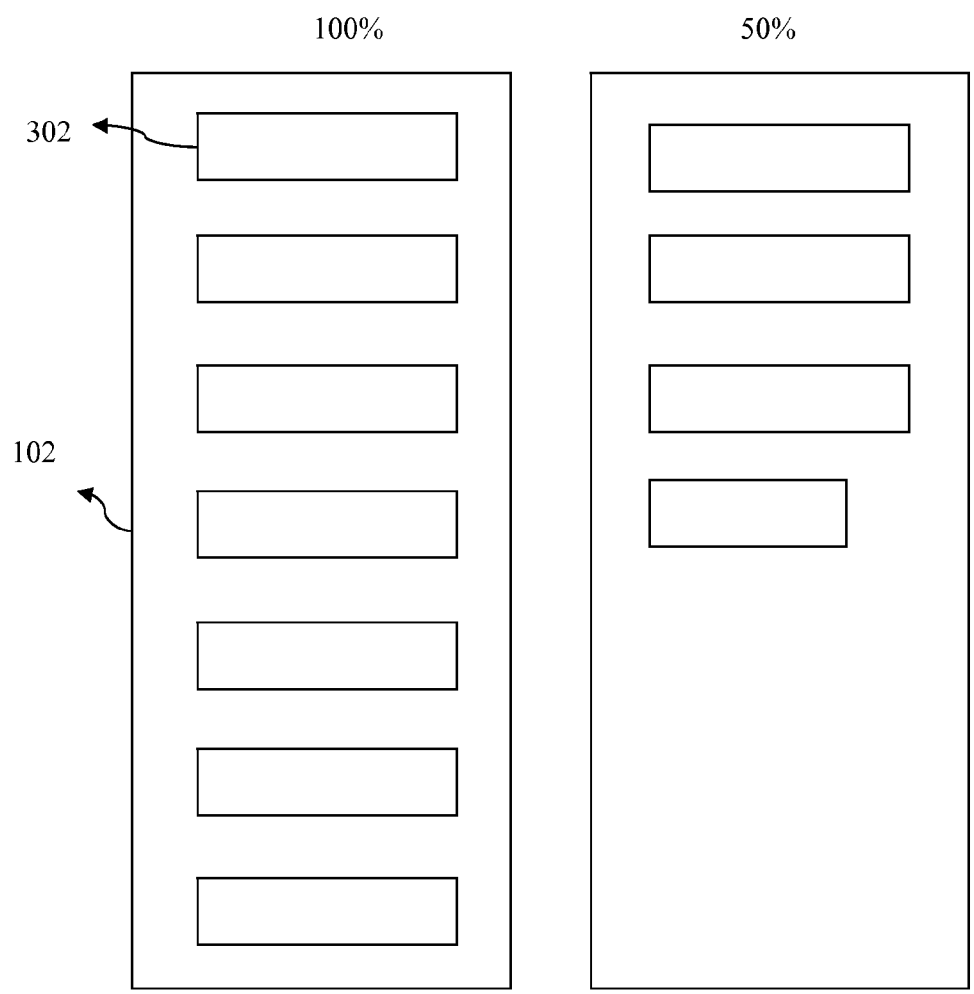
FIG. 7 illustrates battery pack configured for alternative capacity by varying the amount of modules in the pack.

FIG. 7 illustrates battery pack configured for alternative capacity by varying the amount of the battery modules in the pack.

Example

Figure 8:
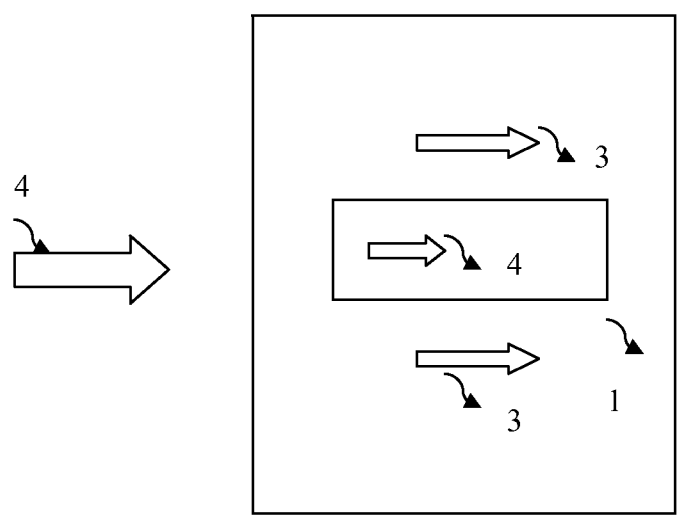
FIG. 8 illustrates an example for an integral battery apparatus contributing to overall vehicle structure.

FIG. 8 illustrates an example for an integral battery apparatus contributing to overall vehicle structure.

The integral battery pack (1) is rigidly attached to the vehicle frame. Considering a scenario of side impact, the force resulting from the impact (2) has to be absorbed by the vehicle structure (3) in a way to minimize danger to occupants.

Using the integral battery modules (1), force can be absorbed in part by the overall vehicle structure (3) and in part by the battery module (4). Thus, the battery module (1) can contribute to the structural strength of the vehicle.

Operating Ranges Associated with the Invention:
a) Battery total weight—120 to 200 kg
b) Battery total volume—0.08 cu m to 1.4 cu m
c) Air flow required—25 cu m per hour per kWhr of installed battery capacity time to swap out battery pack—less than 10 minutes

ADVANTAGES OF THE INVENTION

The technical advancements of the present invention include:
The system is providing dual purpose of protecting the batteries and contributing to the overall structural performance of the vehicle.
The system is also providing the space for battery modules which can be filled with a varying number of modules to achieve variable battery ratings.
The system is making battery swapping simple and efficient.

We claim:
1. An apparatus for battery packaging for an electric vehicle, the apparatus comprising:
a plurality of battery modules, each of the plurality of battery modules comprising a first electrical receptacle at bottom thereof;
a housing commensurating with geometry of the plurality of battery modules, wherein the housing is adapted to compactly accommodate the plurality of battery modules;
an internal base surface of the housing covered with an electro-mechanical insulator and comprising a pair of bus bars mounted thereon, wherein the electro-mechanical insulator is adapted to extend electrical contacts to the first electrical receptacle of each of the battery modules;
a plurality of interlocking blocks affixed at an outer surface of at least one face of the housing, each interlocking block having a hole on the surface thereof;
a plurality of locator pins disposed on an adjoining vertical surface of the vehicle, wherein each of the plurality of locator pins is adapted to mechanically secure a corresponding interlocking block;
a slidable ratchet comprising a plurality of flat surfaces and a plurality of slidable depressions, wherein the slidable ratchet is disposed beneath the plurality of interlocking blocks upon engagement of each of the plurality of locator pins with a corresponding interlocking block to lock the corresponding interlocking block, wherein each of the plurality of interlocking blocks is locked between a flat surface of the plurality of flat surfaces and a corresponding locator pin; and a second electrical receptacle extending from at least one surface of the housing for establishing an electrical connection with an electrical contact of the vehicle.

2. The apparatus for battery packaging according to claim 1, further comprising a lid for the housing attached using screws to secure the housing.

3. The apparatus for battery packaging according to claim 1, further comprising a plurality of cooling ports to cool the interior of the housing.

4. The apparatus for battery packaging according to claim 1, wherein the electro-mechanical insulator is manufactured from synthetic rubber.

5. The apparatus for battery packaging according to claim 1, wherein the housing is fabricated from molded reinforced plastic.

6. The apparatus for battery packaging according to claim 1, wherein the housing is fabricated from fiber glass filled polypropylene.

7. The apparatus for battery packaging according to claim 1, wherein the pair of bus bars is made of copper.

* * * * *